United States Patent
Visvanathan et al.

(10) Patent No.: US 8,937,863 B2
(45) Date of Patent: Jan. 20, 2015

(54) SCHEME AND APPARATUS FOR MULTI-RESOURCE FLOW CONTROL

(75) Inventors: Arun Visvanathan, San Diego, CA (US); Vijay Kumar Kadagala, San Diego, CA (US); Liangchi Hsu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 446 days.

(21) Appl. No.: 13/084,010

(22) Filed: Apr. 11, 2011

(65) Prior Publication Data

US 2011/0249555 A1    Oct. 13, 2011

Related U.S. Application Data

(60) Provisional application No. 61/323,099, filed on Apr. 12, 2010.

(51) Int. Cl.
| | | |
|---|---|---|
| H04W 28/10 | (2009.01) | |
| G06F 1/32 | (2006.01) | |
| G06F 1/20 | (2006.01) | |

(52) U.S. Cl.
CPC .............. G06F 1/3203 (2013.01); G06F 1/206 (2013.01)
USPC ........................................................ 370/235

(58) Field of Classification Search
USPC ........................................................ 370/325
See application file for complete search history.

(56) References Cited

U.S. PATENT DOCUMENTS

| 6,236,214 B1 | 5/2001 | Camp, Jr. et al. |
|---|---|---|
| 6,898,438 B1* | 5/2005 | Uchida .......................... 455/522 |
| 2007/0132607 A1* | 6/2007 | Nagano .................... 340/870.17 |
| 2008/0085717 A1 | 4/2008 | Chhabra et al. |
| 2008/0188222 A1* | 8/2008 | Oh ................................. 455/436 |
| 2009/0215442 A1 | 8/2009 | Lindoff et al. |

FOREIGN PATENT DOCUMENTS

| JP | 2008059040 A | 3/2008 |
|---|---|---|
| WO | WO-2008042813 | 4/2008 |
| WO | WO2009143487 | 11/2009 |

OTHER PUBLICATIONS

International Search Report and Written Opinion—PCT/US2011/032147—ISA/EPO—Nov. 15, 2011.

* cited by examiner

*Primary Examiner* — Dang Ton
*Assistant Examiner* — Mewale Ambaye
(74) *Attorney, Agent, or Firm* — Charles E. Eggers

(57) ABSTRACT

Systems and methods for controlling the flow of a wireless communication apparatus based on a plurality of resources. The levels of each of a plurality of resources are monitored and the flow state of the apparatus is set to ensure safe operation in view of disparate usage of the resources. In one embodiment an individual flow state is determined with respect to each resource. One of the individual flow states is then selected for the apparatus as a whole.

22 Claims, 7 Drawing Sheets

SCHEME AND APPARATUS FOR MULTI-RESOURCE FLOW CONTROL

CROSS REFERENCE TO RELATED APPLICATION(S)

This application claims the benefit of U.S. Provisional Application No. 61/323,099, filed Apr. 12, 2010, the entire content of which is incorporated herein by reference.

BACKGROUND

1. Field

The present application relates generally to wireless communication, and more specifically to systems and methods for controlling communication flow based on available resources.

2. Background

Wireless communication apparatuses are constrained in terms of resources such as memory, processing capacity, heat dissipation capacity etc. When such devices are used, for example, for data calls at very high throughput in a fading environment, the devices may run out of memory or computing capacity. The devices may also heat up to an unsustainable temperature. Thus, it is desirable to control flow for such devices in order to keep the devices with in a safe operating conditions.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include identifying a plurality of nodes using limited resources.

In one embodiment, an apparatus for wireless communication is disclosed. The apparatus includes a processor. The processor is configured to obtain a usage level for each of a plurality of resources, determine a set of flow states for the apparatus based, at least in part, on each respective usage level of each of the plurality resources, determine a potential flow state based, at least in part, on the set of flow states, compare the potential flow state to a current flow state, and set the current flow state of the apparatus to the potential flow state responsive to the comparison.

In another embodiment, a method for wireless communication is disclosed. The method includes obtaining a usage level for each of a plurality of resources, determining a set of flow states for an apparatus based, at least in part, on each respective usage level of each of the plurality resources, determining a potential flow state based, at least in part, on the set of flow states, comparing the potential flow state to a current flow state, and setting the current flow state of the apparatus to the potential flow state responsive to the comparison.

In another embodiment, an apparatus for wireless communication is provided. The apparatus includes means for obtaining a usage level for each of a plurality of resources, means for determining a set of flow states for the apparatus based, at least in part, on each respective usage level of each of the plurality resources, means for determining a potential flow state based, at least in part, on the set of flow states, means for comparing the potential flow state to a current flow state, and means for setting the current flow state of the apparatus to the potential flow state responsive to the comparison.

In another embodiment, a computer readable medium is provided. The computer readable medium includes instructions that, when executed, cause an apparatus to perform a method for wireless communication. The method includes obtaining a usage level for each of a plurality of resources, determining a set of flow states for the apparatus based, at least in part, on each respective usage level of each of the plurality resources, determining a potential flow state based, at least in part, on the set of flow states, comparing the potential flow state to a current flow state, and setting the current flow state of the apparatus to the potential flow state responsive to the comparison.

DETAILED DESCRIPTION

Figure 1:
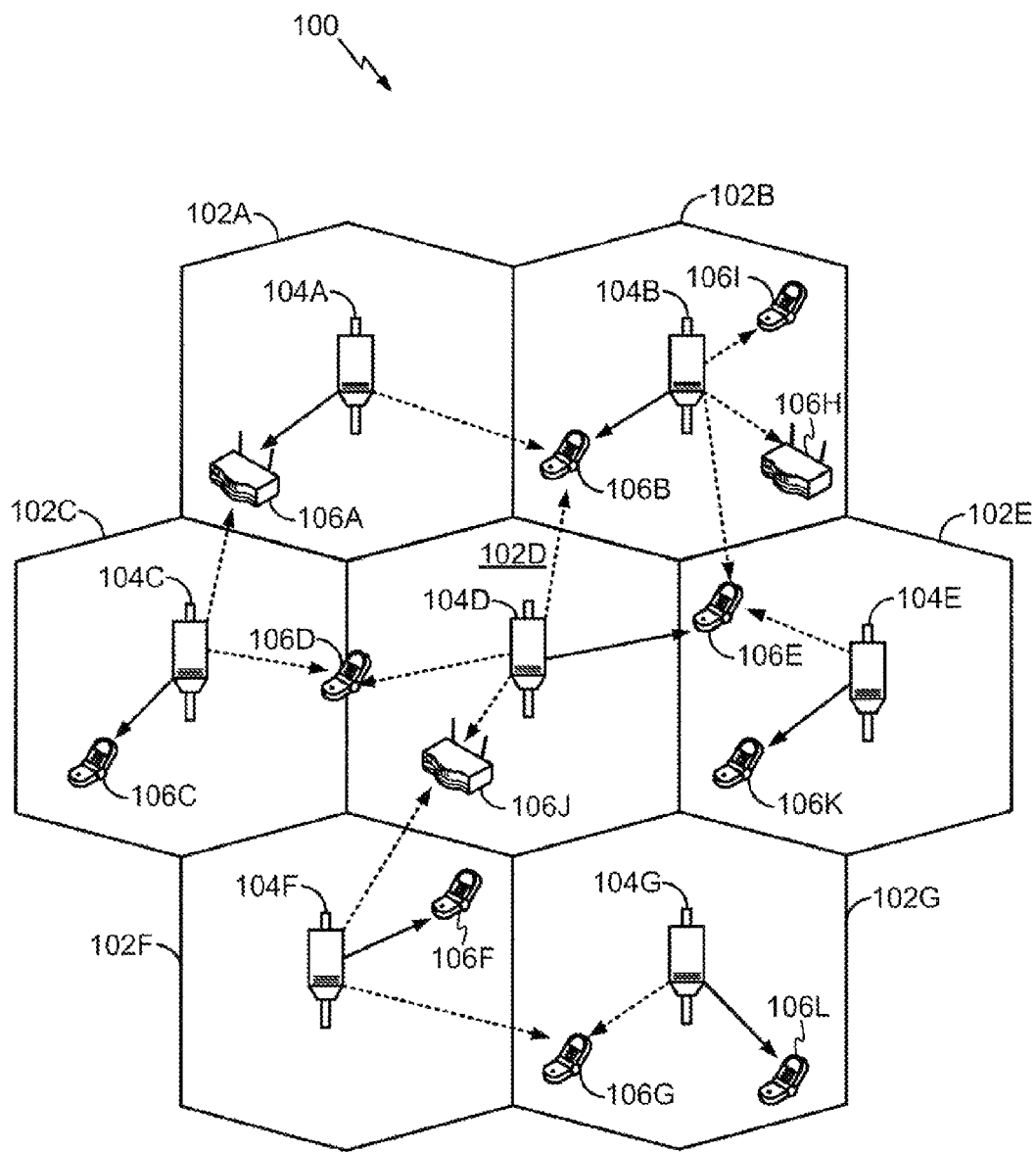
FIG. 1 illustrates an exemplary wireless communication network.

The word "exemplary" is used herein to mean "serving as an example, instance, or illustration." Any embodiment described herein as "exemplary" is not necessarily to be construed as preferred or advantageous over other embodiments. The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDMA, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

In some aspects the teachings herein may be employed in a network that includes macro scale coverage (e.g., a large area cellular network such as a 3G networks, typically referred to as a macro cell network) and smaller scale coverage (e.g., a residence-based or building-based network environment). As an user equipment ("UE") moves through such a network, the user equipment may be served in certain locations by access nodes ("ANs") that provide macro coverage while the user equipment may be served at other locations by access nodes that provide smaller scale coverage. In some aspects, the smaller coverage nodes may be used to provide incremental capacity growth, in-building coverage, and different services (e.g., for a more robust user experience). In the discussion herein, a node that provides coverage over a relatively large area may be referred to as a macro node. A node that provides coverage over a relatively small area (e.g., a residence) may be referred to as a femto node. A node that provides coverage over an area that is smaller than a macro area and larger than a femto area may be referred to as a pico node (e.g., providing coverage within a commercial building).

A cell associated with a macro node, a femto node, or a pico node may be referred to as a macro cell, a femto cell, or a pico cell, respectively. In some implementations, each cell may be further associated with (e.g., divided into) one or more sectors.

In various applications, other terminology may be used to reference a macro node, a femto node, or a pico node. For example, a macro node may be configured or referred to as an access node, base station, access point, eNodeB, macro cell, and so on. Also, a femto node may be configured or referred to as a Home NodeB, Home eNodeB, access point base station, femto cell, and so on.

FIG. 1 illustrates an exemplary wireless communication network 100. The wireless communication network 100 is configured to support communication between a number of users. The wireless communication network 100 may be divided into one or more cells 102, such as, for example, cells 102a-102g. Communication coverage in cells 102a-102g may be provided by one or more nodes 104, such as, for example, nodes 104a-104g. Each node 104 may provide communication coverage to a corresponding cell 102. The nodes 104 may interact with a plurality of user equipments (UEs), such as, for example, UEs 106a-106l.

Each UE 106 may communicate with one or more nodes 104 on a forward link (FL) and/or a reverse link (RL) at a given moment. A FL is a communication link from a node to a UE. A RL is a communication link from a UE to a node. The nodes 104 may be interconnected, for example, by appropriate wired or wireless interfaces and may be able to communicate with each other. Accordingly, each UE 106 may communicate with another UE 106 through one or more nodes 104. For example, the UE 106j may communicate with the UE 106h as follows. The UE 106j may communicate with the node 104d. The node 104d may then communicate with the node 104b. The node 104b may then communicate with the UE 106h. Accordingly, a communication is established between the UE 106j and the UE 106h.

The wireless communication network 100 may provide service over a large geographic region. For example, the cells 102a-102g may cover only a few blocks within a neighborhood or several square miles in a rural environment. In one embodiment, each cell may be further divided into one or more sectors (not shown).

As described above, a node 104 may provide a user equipment (UE) 106 access within its coverage area to a communications network, such as, for example the internet or a cellular network.

A UE 106 may be a wireless communication device (e.g., a mobile phone, router, personal computer, server, etc.) used by a user to send and receive voice or data over a communications network. A user equipment (UE) may also be referred to herein as an access terminal (AT), as a mobile station (MS), or as a terminal device. As shown, UEs 106a, 106h, and 106j comprise routers. UEs 106b-106g, 106i, 106k, and 106l comprise mobile phones. However, each of UEs 106a-106l may comprise any suitable communication device.

Figure 2:
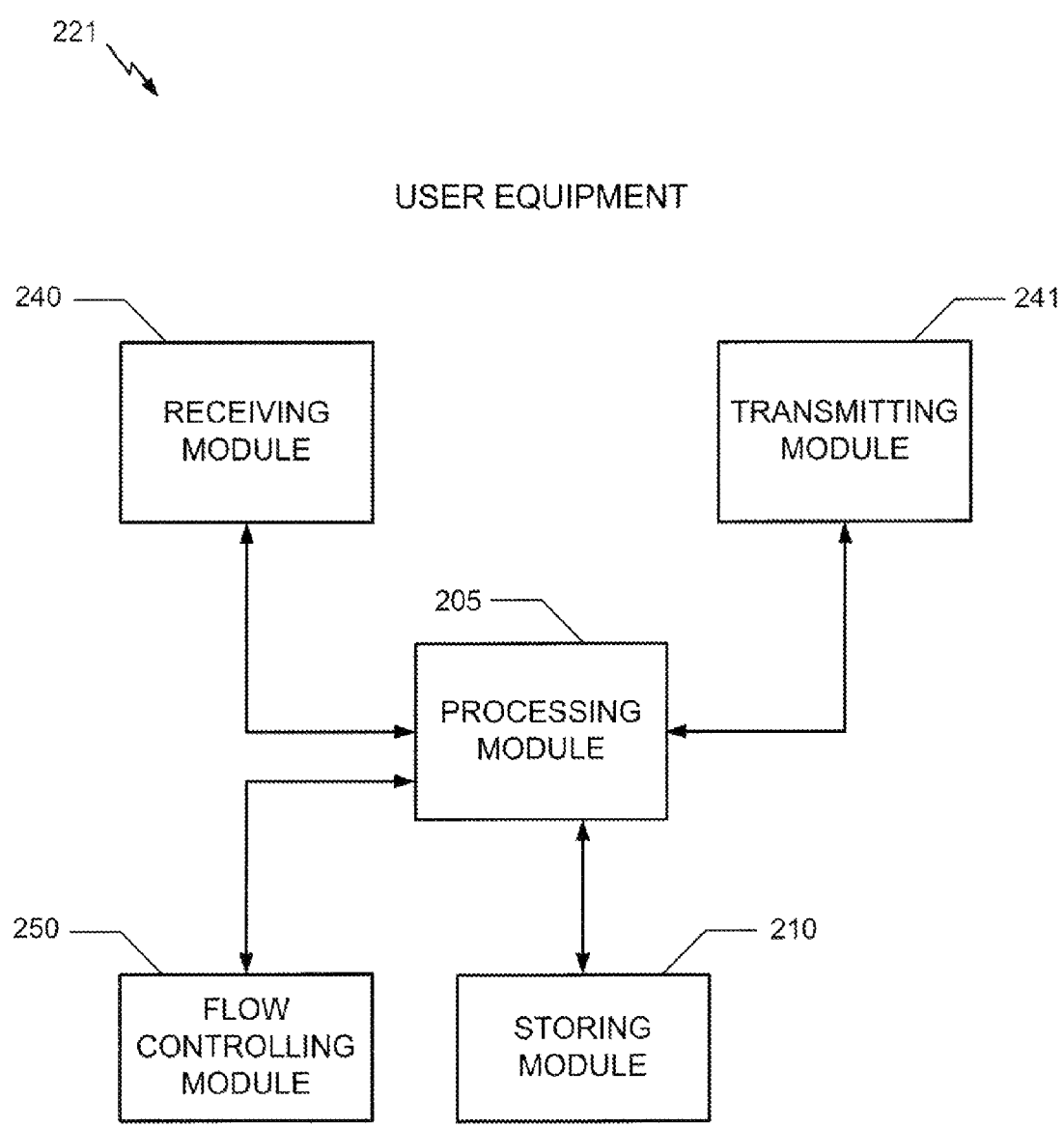
FIG. 2 is a functional block diagram of a wireless communication apparatus in the communication network of FIG. 1.

FIG. 2 is a functional block diagram of an exemplary UE 221 in the communication network of FIG. 1. The UE 221 may be, for example, a mobile phone. The UE 221 may comprise a processing module 205 configured to process information for storage, transmission, and/or for the control of other components of the UE 221. The processing module 205 may be coupled to a storing module 210. The processing module 205 may read information from or write information to the storing module 210. The storing module 210 may be configured to store information before, during or after processing. The processing module 205 may also be coupled to a receiving module 240 and a transmitting module 241. The receiving module 240 may be configured to receive an inbound wireless message from a node, such as the node 104A of FIG. 1. The transmitting module 241 may be configured to transmit an outbound wireless message to a node.

The inbound wireless message may be passed to the processing module 205 for processing. For example, pilot signals received by the receiving module 240 may be passed to the processing module 205. The receiving module 240 and the transmitting module 241 may comprise an antenna and a transceiver. The transceiver may be configured to modulate/demodulate the outbound/inbound wireless messages going to or coming from a node. The outbound/inbound wireless messages may be transmitted/received via the antenna. The antenna may be configured to communicate with a node over one or more channels. The outbound/inbound wireless message may comprise voice and/or data-only information (collectively referred to herein as "data"). The receiving module 240 may demodulate the data received. The transmitting module 241 may modulate data to be sent from the UE 221. The processing module 205 may provide data to be transmitted.

The storing module 210 may comprise processing module cache, including a multi-level hierarchical cache in which different levels have different capacities and access speeds. The storing module 210 may also comprise random access memory (RAM), other volatile storage devices, or non-volatile storage devices. The storage may include hard drives, optical discs, such as compact discs (CDs) or digital video discs (DVDs), flash memory, floppy discs, magnetic tape, and Zip drives.

The processing module 205 may be further coupled to a flow controlling module (FCM) 250. The FCM 250 may be configured to monitor resource levels (e.g., usage levels for a plurality of resources of the UE) for the UE and to adjust the flow state of the UE 221 responsive to the resource levels. In operation, the UE 221 is constrained by the availability of resources. For example, the processing module may only be capable of a maximum number of operations per unit of time. Similarly, the storing module 210 may only have capacity to store a finite amount of data. Other constrained resources may include, for example, heat dissipation capacity, bandwidth, and power. The FCM 250 may be configured to monitor one or more of these resources and to determine one or more flow states for the operation of the UE 221 based on the monitored resources. Advantageously, this allows the UE 221 to operate in a sustainable manner without disruptions that may result from operating at a flow state which exceeds resources. Certain aspects of the FCM 250 are described in greater detail below with respect to FIGS. 3-7.

Although described separately, it is to be appreciated that functional blocks described with respect to the user equipment 221 need not be separate structural elements. For example, the processing module 205, the storing module 210, and the FCM 250 may be embodied in a single chip. The processing module 205 and FCM 250, may additionally, or in the alternative, contain memory, such as registers. Similarly, one or more of the functional blocks or portions of the functionality of various blocks may be embodied in a single chip. Alternatively, the functionality of a particular block may be implemented on two or more chips.

One or more of the functional blocks and/or one or more combinations of the functional blocks described with respect to the UE 221, such as the processing module 205 and FCM 250 may be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. One or more of the functional blocks and/or one or more combinations of the functional blocks described with respect to the UE 221 may also be implemented as a combination of computing devices, e.g., a combination of a DSP and a microprocessor, a plurality of microprocessors, one or more microprocessors in conjunction with a DSP communication, or any other such configuration.

Figure 3:
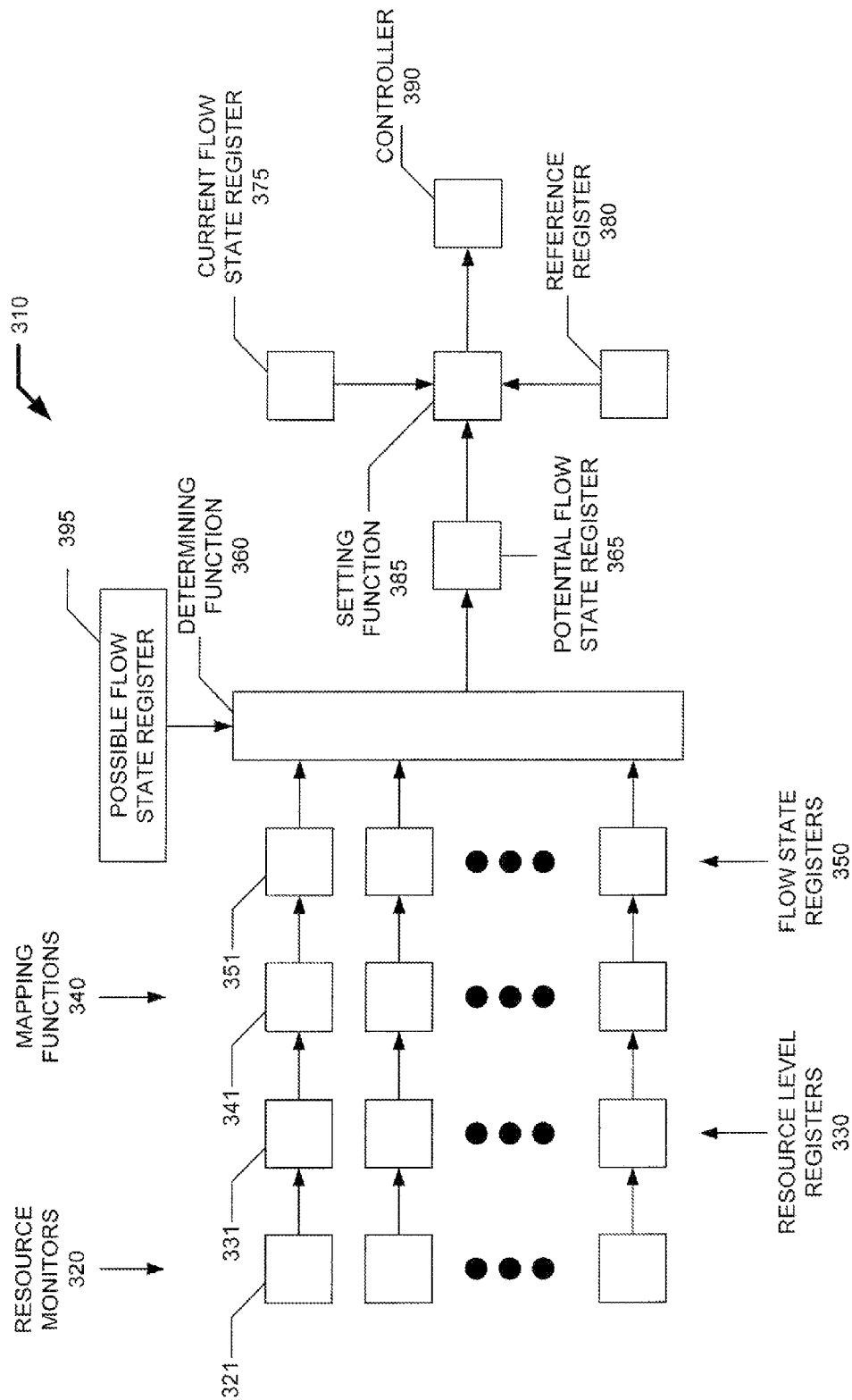
FIG. 3 is a functional block diagram of an exemplary multi-resource flow controller.

FIG. 3. is a functional block diagram of an exemplary multi-resource flow controller (FC) 310. In one embodiment, the FC 310 corresponds to the flow controlling module 250 of FIG. 2. The FC 310 comprises one or more resource monitors 320. Each resource monitor 320 may be configured to monitor the status or usage level of a particular resource for the UE 221. For example, the resource monitor 321 may be configured to monitor the amount of memory available in a particular pool or other grouping of memory. In some embodiments, the resource monitors 320 may monitor resources by performing periodic and/or aperiodic active polling of a controller for a particular resource. For example, the resource monitor 321 may poll a memory controller to determine available memory or a processor in order to determine available processing capacity. In another embodiment, the resource monitors may be configured to passively receive updates regarding one or more resource levels. In another embodiment, the resource monitors 321 may comprise sensors which directly measure quantities such as temperature.

The FC 310 further comprises one or more resource level registers 330. The resource level registers 330 are configured to store respective resource levels for the resources monitored by the resource monitors 320. The types of values stored by the resource level registers 330 may correspond to the types of resources being monitored. Thus, for example, if the resource monitor 321 is monitoring temperature, the resources level register 331 may store a numerical value indicative of temperature. In another example, if the resource monitor 321 is monitoring memory availability, the resource level register 331 may store a flag indicative of a predetermined availability level. These types of information stored in the resource level registers are discussed in greater detail below with respect to FIG. 4.

The FC 310 further comprises a set of mapping functions 340 for mapping resource levels to flow states. Each mapping function 340 is configured to take a value stored in a resource level register 330 and to output a corresponding flow state for the UE 221, wherein, in general, a flow state corresponds to a level of the operation of the UE 221. In one embodiment, the mapping corresponds to an appropriate flow state for the UE 221 based on a particular resource level for one resource when all other resources are assumed to be abundant. As described above, the inputs for each mapping function 340 may be different based on the type of resource being monitored. For example, the input for a mapping function 341 may be numerical temperature values. In another example, the input for the mapping function 341 may be flags indicative of memory availability numbers. Despite the different types of input, the outputs of the mapping functions 340 may correspond to a single domain. For example, the outputs of each of the mapping functions 340 may correspond to potential flow states for the UE 221.

As stated above, in general, a flow state corresponds to a level of the operation of the UE 221. In one embodiment, the flow state may correspond to a radio link control window size for the UE 221. By setting the window size, the UE is able to constrain the level of operation, or flow state. For example, if the window is set to 2048, 2048 packets of data may be transmitted/received for each transmission/reception. However, if the window size is set to 1, a single of packet of data may be transmitted/received for each transmission/reception. With the smaller window, data is transmitted/received much less quickly. Similarly, resources are consumed much more slowly. Smaller windows and corresponding operation levels may be referred to as lower or more constrained flow states. Conversely, a larger window means that data is transmitted/received more quickly and that resources are consumed more quickly. Larger windows and corresponding operation levels may be referred to as higher or less constrained flow states. In other embodiments, radio link control window size may not used as a proxy for flow state. Rather, in other embodiments, an amount of throughput, an amount of physical layer throughput, media access control (MAC) layer throughput, application layer throughput, bandwidth, spreading factor, or radio link protocol window size may be used. These values may be considered for the uplinks and/or the downlinks of the UE 221. In other embodiments, a flow state may correspond to discarding an amount of data received by the UE 221 or to limiting the transmission of data from the UE 221.

The FC 310 further comprises a set of flow state registers 350. The flow state registers 350 are configured to store the outputs from respective mapping functions 340. Thus for example, if the mapping function 341 generates an output indicative of a flow state corresponding to a window size of 2048, the flow state register 351 would store the 2048 value.

The FC 310 further comprises a determining function 360. The determining function 360 is configured to determine a potential flow state based upon the flow states stored in each of the flow state registers 350. In one embodiment, the determining function 360 is a selection function that selects one of the flow states stored in the flow state registers 350. In one embodiment, the determining function 360 is configured to select the most constrained, or lowest, flow state from the flow states stored in the flow state registers 350. This lowest flow state corresponds to the flow state indicating the lowest level of operation of the UE 221. Advantageously, by selecting the most constrained flow state, the UE can ensure that it operates in a manner that does not exceed the capacity of the most constrained resource. For example, even if memory and processing resources are abundant, corresponding to less constrained flows, if the UE 221 is overheating, corresponding to a more constrained flow, selecting the most constrained flow state will allow the UE to operated safely.

The FC 310 further comprises a potential flow state register 365 and a current flow state register 375. The potential flow state register 365 is configured to store the output of the determining function 360. The current flow state register 375 is configured to store the flow state at which the UE 221 is operating, the current flow state having been determined and set at some previous time.

The FC 310 further comprises a setting function 385. The setting function 385 is configured to set the flow state of the UE 221 based, at least in part, on the potential flow state from the potential flow state register 365 and the current flow state from the current flow state register 375. In one example, the setting function 385 is configured to compare the potential and current flow states. If the two flow states are equivalent, the setting function 385 may not take any action. However, if the potential and current flow states are different, the setting function may perform one or more functions. These functions may include storing the potential flow state in the current flow state register 375, thereby updating the current flow state register 375. The functions may also include setting the flow state of the UE 221 to the potential flow state. This may be accomplished by communicating the potential flow state to a controller 390 responsible for setting the flow state of the UE 221. The controller 390 may receive the potential flow state, e.g., a particular window size, and adjust system flow by setting the window size for the UE 221. In other embodiments, other system parameters or functions may be used to adjust the flow state. These include, but are not limited to, physical layer throughput, bandwidth, spreading factor, and radio link protocol window size.

As illustrated, the FC 310 may comprise a reference register 380. The reference register 380 may store a reference to the controller 390. In some embodiments, the FC 310 may be configured to control one of a plurality of flow states via one or more controllers 390. For example, the FC 310 may be configured to control a flow state corresponding to the uplink window size or to the downlink window size. Thus, the reference register 380 may store a reference to the controller 390 corresponding to the controller 390 for the flow state being controlled. The setting function 385 may then use the reference to identify the appropriate controller 390.

The FC 310 may also comprise a possible flow state register 395. The possible flow state register 395 may store the entire set of possible flow states for the UE 221. The output from the possible flow state register 395 may be used by the determining function 360 in selecting a potential flow state. For example, the determining function may use the set of possible states to determine which of the flow states from the flow state register 350 is the most constrained. If the set of possible flow states is ordered from most constrained to least constrained, the determining function 360 may determine the most constrained of the outputs from the flow state registers 350 by comparing the outputs to the ordered flow states in the set. Advantageously, the present embodiments allow for control of flow in the UE 221 based on multiple resources. The join flow control facilitates safe operation even when the consumption of resources is not balanced.

The resource level registers 330, flow state registers 350, potential flow state register 365, current flow state register 375, reference register 380, and possible flow state register 395 may comprise processing module cache, random access memory (RAM), other volatile storage devices, or non-volatile storage devices. Further, the registers not be separate structural elements and may be embodied in a single chip. The registers and their functionality may also be implemented by storing module 210, flow controlling module 250, or processing module 205 of FIG. 2.

The resource monitors 320, mapping functions 340, determining function 360, setting function 385, and controller 390 may be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. One or more of the functional blocks and/or one or more combinations of the functional blocks described with respect to the FC 310 may also be implemented as a combination of computing devices, e.g., a combination of a DSP and a microprocessor, a plurality of microprocessors, one or more microprocessors in conjunction with a DSP communication, or any other such configuration. The functionality of the resource monitors 320, mapping functions 340, determining function 360, setting function 385, and controller 390 may be implemented by the flow controlling module 250, or processing module 205 of FIG. 2.

Figure 4A:
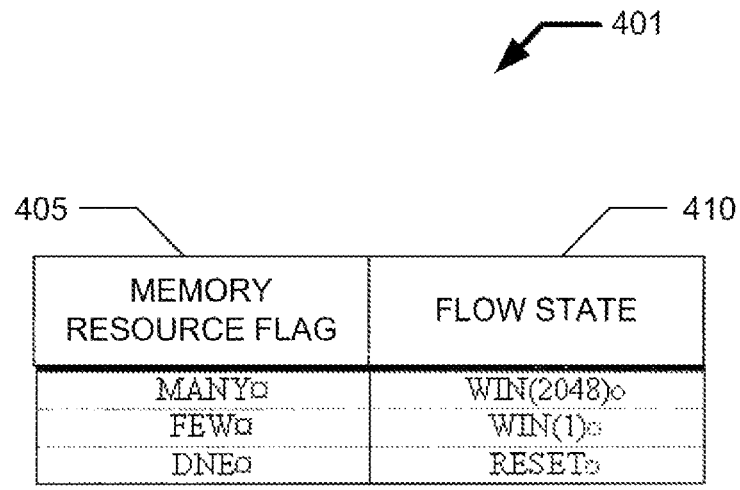
FIG. 4A-B are tables illustrating exemplary mappings of resource levels to flow states for a wireless communication apparatus.
Figure 4B:
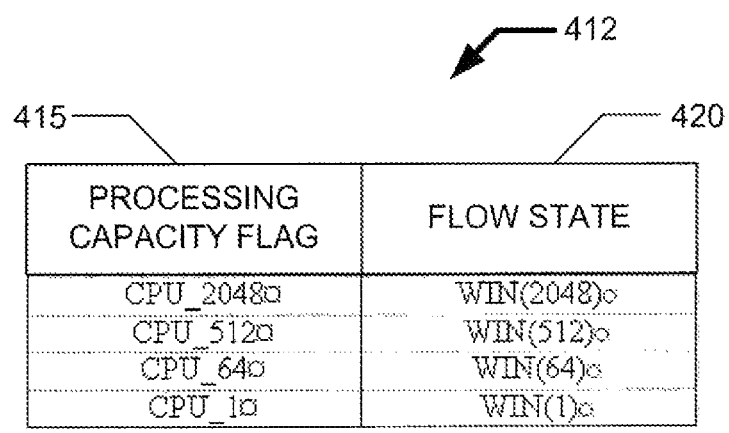

FIG. 4A-B are tables illustrating exemplary mappings of resource levels to flow states for a wireless communication apparatus. The tables 401 and 412 correspond to the functionality of the mapping functions 340 of FIG. 3. In table 401 the column 405 contains flags indicative of memory resource levels in a particular memory pool. The flags include a "many" flag indicative of abundant memory, a "few" flag indicative of less available memory, and a "DNE" flag indicative of little to no remaining memory. The column 410 contains entries representative of flow states for the UE 221. The flow states include "WIN(2048)" indicative of a window size of 2048, "WIN(1)" indicative of a window size of 1, and "RESET" indicative of a reset condition associated with the memory. Each entry in column 405 maps to the flow state in the corresponding entry of column 410. As shown, the flags corresponding to less memory map to more constrained flow states.

In table 412 the column 415 contains flags indicative of processing capacity resource levels. The flags include a "CPU_2048" flag indicative of abundant processing capacity and "CPU_512," "CPU_64," and "CPU_1" flags each representing progressively less abundant processing resources. The column 420 contains entries representative of flow states for the UE 221. The flow states include "WIN(2048)," indicative of a window size of 2048 and "WIN(512)," "WIN(64)," and "WIN(1)" states corresponding to progressively smaller window sizes. Each entry in column 415 maps to the flow state in the corresponding entry of column 420. As shown, the flags corresponding to less processing capacity map to more constrained flow states.

Advantageously, the mappings illustrated facilitate flow control for the UE 221 based on disparate types of resource levels. As each resource maps to a common set of flow states, a best flow state for the UE 221 can be selected despite constraints by different types of resources.

Figure 5:
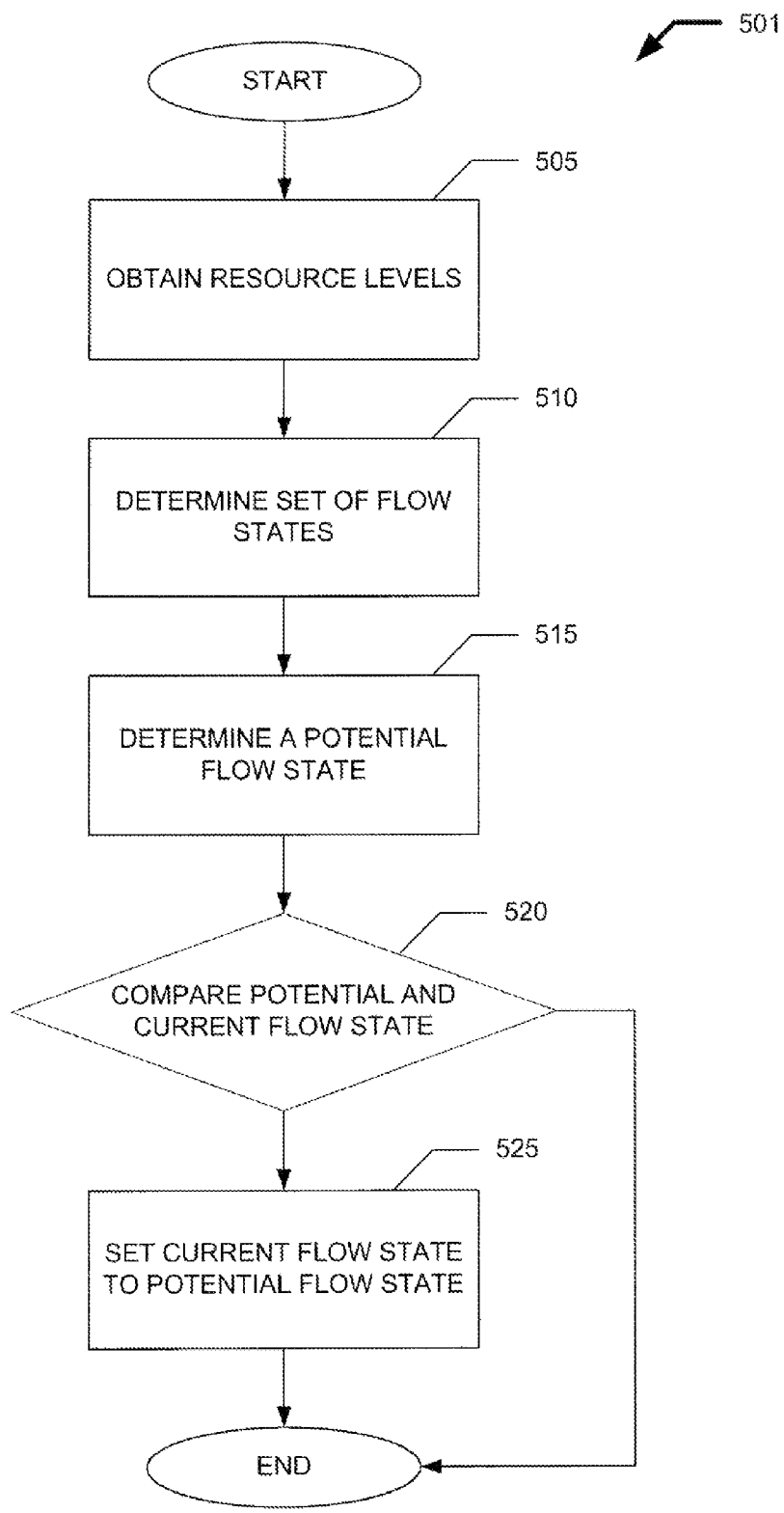
FIG. 5 is a flow chart illustrating an exemplary process for multi-resource flow control on a wireless communication apparatus.

FIG. 5 is a flow chart illustrating an exemplary process 501 for multi- resource flow control on a wireless communication apparatus. In one embodiment, the process 501 may be performed by the FC 310 of FIG. 3 on the UE 221 of FIG. 2. At a step 505, the FC obtains resource level information. This may be accomplished by resource monitors such as the resource monitors 320 in conjunction with the resource level registers 330 of FIG. 3. In another embodiment, the resource monitors 320 send a message to the FC that new resource level information is available. The resource monitors 320 may determine new resource level information is available by determining that the usage level of a resource has hit a threshold level and/or changed by a threshold amount. At step 510, the FC determines a set of flow states. This may be accomplished by the mapping functions 340 in conjunction with the resource level registers 330. In particular, a mapping function, such as the mapping function 341 may receive the resource level from the resource level register 330. The mapping function could then use the resource level as an index into a table such as the table 401 of FIG. 4. The corresponding entry in the table would be the flow state based on the one resource level. The flow state could then be stored in the flow state register 351. At step 515, the FC determines a potential flow state. This may be accomplished by the determining function 360 in conjunction with the flow state registers 350 of FIG. 3. As described above, in one embodiment, the determining function may select the most constrained flow state as the potential flow state and store the potential flow state in the potential flow state register 365.

At step 520, the potential and current flow states are compared. This functionality may be accomplished by the setting function 385 of FIG. 3 by comparing the contents of the potential flow state register 365 and the current flow state register 375. In one embodiment, the setting function determines if the potential flow state and current flow state are equivalent. Based on the comparison, the process 501 may conclude. Alternatively, at step 525, the current flow state is set to the potential flow state. This may be accomplished by the setting function 385 in conjunction with the controller 390 of FIG. 3. In one embodiment, step 525 is performed when the current and potential flow states are not equivalent. After updating the current flow state, the process 501 ends.

Figure 6:
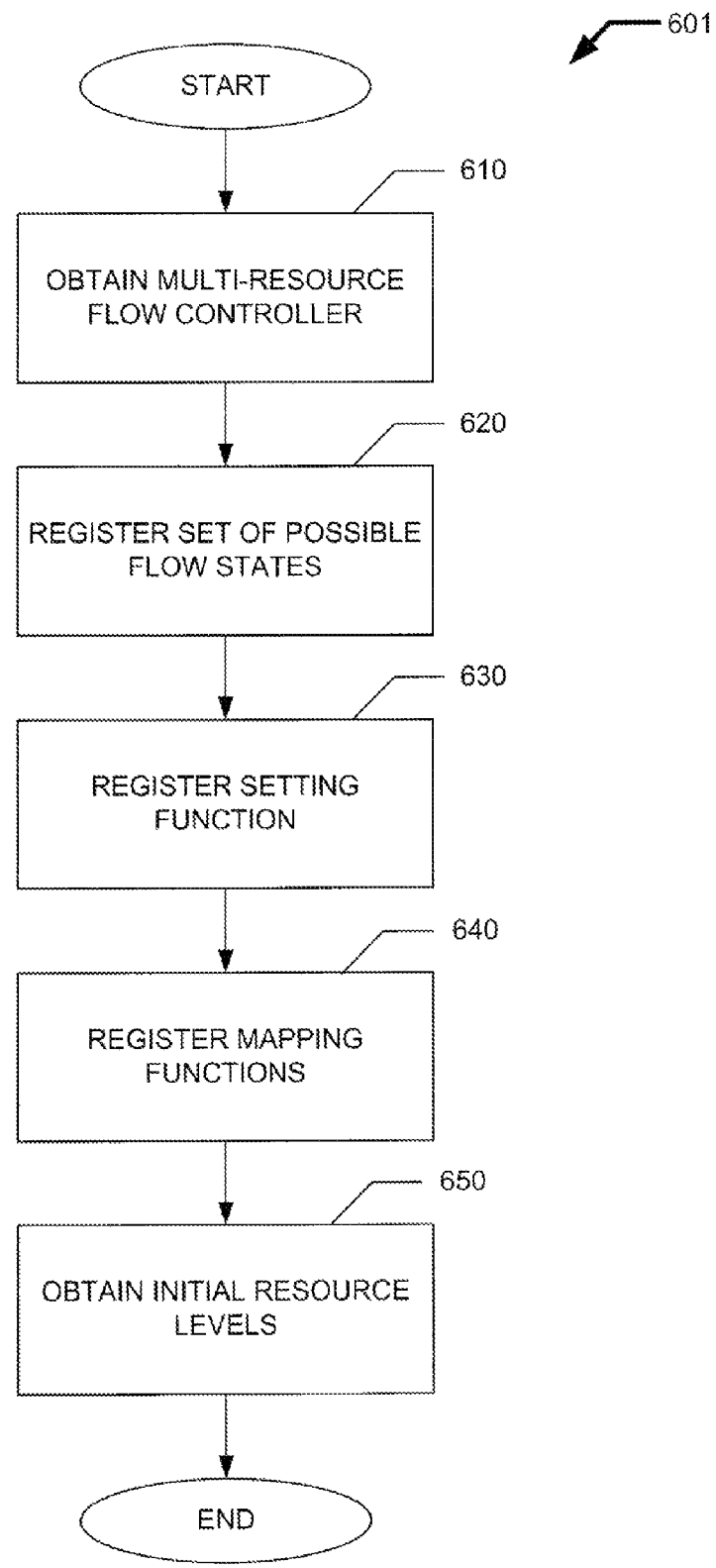
FIG. 6 is a flow chart illustrating an exemplary process for initializing a multi-resource flow control on a wireless communication apparatus.

FIG. 6 is a flow chart illustrating an exemplary process 601 for initializing a multi- resource flow control on a wireless communication apparatus such as the UE 221 of FIG. 2. The method may be performed by the controller 390 in conjunction with other functional blocks of FIG. 3 as described below. At step 610, the controller obtains a multi-resource flow controller. In one embodiment this may be done by creating a flow controller object. In another embodiment, this may be done by associating with an existing flow controller. At step 620, the controller registers a set of possible flow states with the flow controller. As described, the set of possible states is indicative of the flow states at which the UE can operate. In one embodiment, this may correspond to the set of possible window sizes. At step 630, the controller registers a setting function with the flow controller. This may be accomplished by providing information sufficient for the allowing the flow controller to provide flow state updates to the controller. For example, the controller may provide the flow controller with a reference to the controller. At step 640, the resource monitors 320 register mapping functions 340 with the flow controller. This may be accomplished by providing information like that contained in tables 401 and 412 of FIG. 4A-B. At step 650, the resource monitors provide initial resource level information to the flow controller. After receiving initial resource information, the flow controller may operate as described above.

Figure 7:
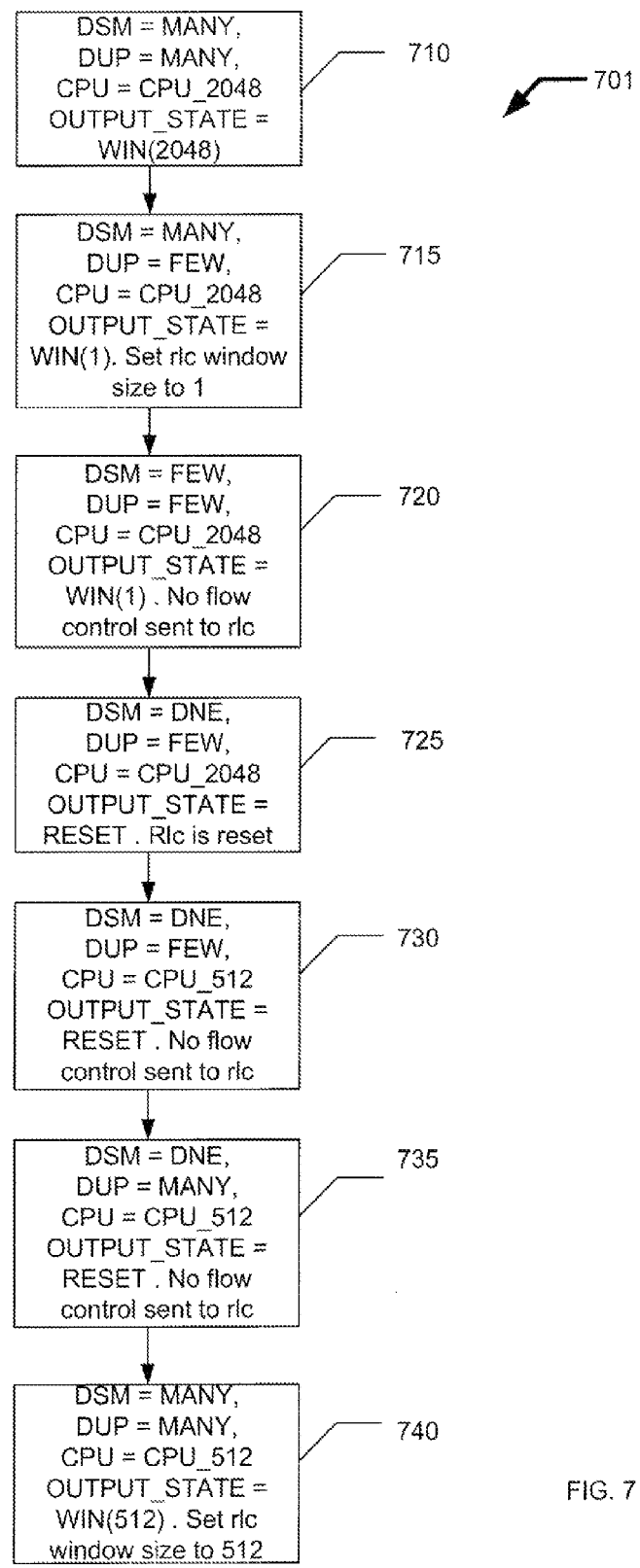
FIG. 7 is a flow chart illustrating an exemplary operation of flow control on a wireless communication apparatus.

FIG. 7 is a flow chart illustrating an exemplary operation of flow control on a wireless communication apparatus. For the purposes of FIG. 7, three separate resources are tracked. The first resource is the memory available in a memory pool called "DSM." The second resource is the memory available in a memory pool called "DUP." The third resource is the processing capacity of a processor called "CPU." In each step of the flow chart, the resource level for the three tracked resources is shown. In addition, the value for the flow state, "OUTPUT_STATE" is shown at each step along with an indication of whether the flow state changed. The values corresponding to each tracked resource are taken from tables 401 and 412 of FIG. 4. The values for the flow states are taken from the same tables. At each step the flow state corresponds to the most constrained flow state as determined from the tables of FIG. 4.

At step 710, both memory pools have "MANY" flags and the CPU has a "CPU_2048" flag. All the resource levels map to WIN(2048) so the output state is set to that level. At step 715, the DUP pool flag drops to "FEW." As that flag maps to a more constrained flow state, the output state is reduced to WIN(1). At step 720, the DSM pool flags drops to "FEW." As the DSM flag now matches the DUP flag corresponding to the more constrained state, no change in the output state is required. At step 725, the DSM flag drops to "DNE." As the "DNE" corresponds to a more constrained flow state, the output state drops to "RESET." At step 730, the CPU flag drops to "CPU_512." However, as the DSM flag corresponds to a more constrained flow state, there is no change in the output state. At step 735, the DUP flag changes to "MANY." However, as the DSM flag corresponds to a more constrained flow state, there is no change in the output state. At step 740, the DSM flag changes to "MANY." At this point the CPU has the most constrained resource so the output state changes to "WIN(512)" corresponding to the CPU flag. As described the flow controller allows for multi-resource control in a manner which facilitates safe operation despite unbalanced and shifting resource consumption patterns.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

The embodiments presented herein and other embodiments are further described in greater detail in the attached Appendix. While the specification describes particular examples of the present invention, those of ordinary skill can devise variations of the present invention without departing from the inventive concept.

Those skilled in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. Thus, the present invention is not intended to be limited to the examples shown herein but is to be accorded the widest scope consistent with the principles and novel features disclosed herein.

What is claimed is:

1. An apparatus for wireless communication comprising:
   a processor, wherein the processor is configured to:
      obtain a usage level for each of a plurality of resources, the plurality of resources comprising at least a heat dissipation capacity;
      determine a set of flow states for the apparatus based, at least in part, on each respective usage level of each of the plurality of resources;
      determine a potential flow state based, at least in part, on the set of flow states, wherein the potential flow state corresponds to a most constrained flow state ensures the usage level for each of the plurality of resources does not exceed its capacity;
      compare the potential flow state to a current flow state; and
      set the current flow state of the apparatus to the potential flow state responsive to the comparison.

2. The apparatus of claim 1, wherein each flow state of the set of flow states corresponds to a level of operation of the apparatus, and wherein the processor is configured to determine the potential flow state by selecting the flow state of the set of flow states having the lowest level of operation.

3. The apparatus of claim 1, wherein the flow state comprises at least one of the following: an amount of physical layer throughput for an uplink, a media access control (MAC) layer throughput for an uplink, an application layer throughput for an uplink, an amount of physical layer throughput for a downlink, a media access control (MAC) layer throughput for a downlink, an application layer throughput for a downlink, bandwidth, spreading factor, and a radio link control window size for the apparatus.

4. The apparatus of claim 1, wherein the plurality of resources comprise at least two of the following: storage capacity of one or more storages and a computational capacity.

5. The apparatus of claim 1, wherein the processor is configured to set the current flow state of the apparatus to the potential flow state when the potential flow state and the current flow state of the apparatus are not equivalent.

6. The apparatus of claim 1, wherein the processor is further configured to:
   obtain an updated usage level for one of the plurality of resources;
   determine an updated flow state based on the updated usage level;
   determine a set of updated flow states for the apparatus based, at least in part, on the updated usage level;
   determine an updated potential flow state based, at least in part, on the updated set of flow states;

compare the updated potential flow state to the current flow state; and set the current flow state of the apparatus to the updated potential flow state responsive to the comparison.

7. The apparatus of claim 1, wherein the processor is further configured to act based on the current flow state.

8. A method for wireless communication comprising:
obtaining a usage level for each of a plurality of resources, the plurality of resources comprising at least a heat dissipation capacity;
determining a set of flow states for an apparatus based, at least in part, on each respective usage level of each of the plurality of resources;
determining a potential flow state based, at least in part, on the set of flow states, wherein the potential flow state corresponds to a most constrained flow state of the set of flow states and wherein the most constrained flow state ensures the usage level for each of the plurality of resources does not exceed its capacity;
comparing the potential flow state to a current flow state; and
setting the current flow state of the apparatus to the potential flow state responsive to the comparison.

9. The method of claim 8, wherein each flow state of the set of flow states corresponds to a level of operation of the apparatus, and wherein determining the potential flow state comprises selecting the flow state of the set of flow states having the lowest level of operation.

10. The method of claim 8, wherein the flow state comprises at least one of the following: an amount of physical layer throughput for an uplink, a media access control (MAC) layer throughput for an uplink, an application layer throughput for an uplink, an amount of physical layer throughput for a downlink, a media access control (MAC) layer throughput for a downlink, an application layer throughput for a downlink, bandwidth, spreading factor, and a radio link control window size for the apparatus.

11. The method of claim 8, wherein the plurality of resources comprise at least two of the following: a storage capacity of one or more storages and a computational capacity.

12. The method of claim 8, wherein setting the current flow state of the apparatus to the potential flow state responsive to the comparison comprises setting the current flow state of the apparatus to the potential flow state when the potential flow state and the current flow state of the apparatus are not equivalent.

13. The method of claim 8, further comprising:
obtaining an updated usage level for one of the plurality of resources;
determining an updated flow state based on the updated usage level;
determining a set of updated flow states for the apparatus based, at least in part, on the updated usage level;
determining an updated potential flow state based, at least in part, on the updated set of flow states;
comparing the updated potential flow state to the current flow state; and
setting the current flow state of the apparatus to the updated potential flow state responsive to the comparison.

14. The method of claim 8, further comprising acting based on the current flow state.

15. An apparatus for wireless communication comprising:
means for obtaining a usage level for each of a plurality of resources, the plurality of resources comprising at least a heat dissipation capacity;
means for determining a set of flow states for the apparatus based, at least in part, on each respective usage level of each of the plurality of resources;
means for determining a potential flow state based, at least in part, on the set of flow states, wherein the potential flow state corresponds to a most constrained flow state of the set of flow states and wherein the most constrained flow state ensures the usage level for each of the plurality of resources does not exceed its capacity;
means for comparing the potential flow state to a current flow state; and
means for setting the current flow state of the apparatus to the potential flow state responsive to the comparison.

16. The apparatus of claim 15, wherein each flow state of the set of flow states corresponds to a level of operation of the apparatus, and wherein the determining means is configured to determine the potential flow state by selecting the flow state of the set of flow states having the lowest level of operation.

17. The apparatus of claim 15, wherein the flow state comprises at least one of the following: an amount of physical layer throughput for an uplink, a media access control (MAC) layer throughput for an uplink, an application layer throughput for an uplink, an amount of physical layer throughput for a downlink, a media access control (MAC) layer throughput for a downlink, an application layer throughput for a downlink, bandwidth, spreading factor, and a radio link control window size for the apparatus.

18. The apparatus of claim 15, wherein the plurality of resources comprise at least two of the following: storage capacity of one or more storages, computational capacity, and heat dissipation capacity.

19. A non-transitory computer readable medium comprising instructions that, when executed, cause an apparatus to perform a method for wireless communication, the method comprising:
obtaining a usage level for each of a plurality of resources, the plurality of resources comprising at least a heat dissipation capacity;
determining a set of flow states for the apparatus based, at least in part, on each respective usage level of each of the plurality of resources;
determining a potential flow state based, at least in part, on the set of flow states, wherein the potential flow state corresponds to a most constrained flow state of the set of flow states and wherein the most constrained flow state ensures the usage level for each of the plurality of resources does not exceed its capacity;
comparing the potential flow state to a current flow state; and
setting the current flow state of the apparatus to the potential flow state responsive to the comparison.

20. The non-transitory computer readable medium of claim 19, wherein each flow state of the set of flow states corresponds to a level of operation of the apparatus, and wherein the potential flow state is determined by selecting the flow state of the set of flow states having the lowest level of operation.

21. The non-transitory computer readable medium of claim 19, wherein the flow state comprises at least one of the following: an amount of physical layer throughput for an uplink, a media access control (MAC) layer throughput for an uplink, an application layer throughput for an uplink, an amount of physical layer throughput for a downlink, a media access control (MAC) layer throughput for a downlink, an application layer throughput for a downlink, bandwidth, spreading factor, and a radio link control window size for the apparatus.

22. The computer readable medium of claim 19, wherein the plurality of resources comprise at least two of the following: storage capacity of one or more storages and a computational capacity.

* * * * *